(12) United States Patent
Hirasawa

(10) Patent No.: US 8,174,741 B2
(45) Date of Patent: May 8, 2012

(54) IMAGE PROCESSING METHOD, PROGRAM FOR IMAGE PROCESSING, AND IMAGE PROCESSING APPARATUS

(75) Inventor: Masahiko Hirasawa, Sapparo (JP)

(73) Assignee: Seiko Epson Corporation, Tokyo (JP)

( * ) Notice: Subject to any disclaimer, the term of this patent is extended or adjusted under 35 U.S.C. 154(b) by 787 days.

(21) Appl. No.: 12/257,955

(22) Filed: Oct. 24, 2008

(65) Prior Publication Data
US 2009/0109508 A1    Apr. 30, 2009

(30) Foreign Application Priority Data
Oct. 24, 2007 (JP) ................. 2007-276286

(51) Int. Cl.
*G03F 3/08* (2006.01)
*H04N 1/60* (2006.01)
*G06K 9/00* (2006.01)
(52) U.S. Cl. ............ 358/521; 358/1.9; 382/162
(58) Field of Classification Search ............ 358/1.9, 358/518, 523, 521, 538; 382/162, 164, 165, 382/167
See application file for complete search history.

(56) References Cited

U.S. PATENT DOCUMENTS

| | | | | | |
|---|---|---|---|---|---|
| 5,696,611 | A | * | 12/1997 | Nishimura et al. | 358/518 |
| 5,754,683 | A | * | 5/1998 | Hayashi et al. | 382/167 |
| 5,926,292 | A | * | 7/1999 | Ishikawa et al. | 358/534 |
| 6,055,071 | A | * | 4/2000 | Kuwata et al. | 358/501 |
| 6,201,550 | B1 | * | 3/2001 | Sakamoto | 345/442 |
| 6,415,065 | B1 | * | 7/2002 | Miyake | 382/300 |
| 7,450,280 | B2 | * | 11/2008 | Hayashi | 358/521 |
| 7,726,765 | B2 | * | 6/2010 | Yoshida et al. | 347/19 |
| 2001/0021042 | A1 | * | 9/2001 | Hirota et al. | 358/505 |
| 2002/0141640 | A1 | | 10/2002 | Kraft | |
| 2003/0059198 | A1 | * | 3/2003 | Yagura et al. | 386/46 |
| 2003/0085950 | A1 | * | 5/2003 | Yashima | 347/43 |
| 2003/0086100 | A1 | * | 5/2003 | Yashima et al. | 358/1.8 |
| 2003/0112483 | A1 | * | 6/2003 | Takano et al. | 358/521 |
| 2005/0036173 | A1 | * | 2/2005 | Hayashi et al. | 358/2.1 |
| 2005/0200703 | A1 | * | 9/2005 | Kobayashi et al. | 348/207.2 |
| 2006/0039017 | A1 | * | 2/2006 | Park et al. | 358/1.9 |
| 2008/0285846 | A1 | * | 11/2008 | Suzuki et al. | 382/164 |
| 2009/0148063 | A1 | * | 6/2009 | Hosoda et al. | 382/266 |

FOREIGN PATENT DOCUMENTS

| | | |
|---|---|---|
| JP | 07-087302 A | 3/1995 |
| JP | 11-025282 | 1/1999 |
| JP | 2001-175243 | 6/2001 |
| JP | 2002-358513 | 12/2002 |

\* cited by examiner

*Primary Examiner* — Madelein A Nguyen
(74) *Attorney, Agent, or Firm* — Nutter McClennen & Fish LLP; John J. Penny, Jr.; Christina M. Sperry

(57) ABSTRACT

An image processing method for generating a gradation image, including the steps of: (a) acquiring a coordinate of a start point, a color value of the start point, a coordinate of an end point, and a color value of the end point; (b) setting either the number of pixels between the start point and the end point that is calculated on the basis of the coordinates that are acquired in the coordinate-and-color-value acquisition (a) or the number of colors between the start point and the end point, whichever is smaller, as the number of complementary colors of a complementary color list; (c) creating the complementary color list that has the number of complementary colors that is set in the complementary-color-number setting (b); and (d) generating the gradation image with the use of the complementary color list that is created in the complementary-color-list creation (c).

9 Claims, 7 Drawing Sheets

IMAGE PROCESSING METHOD, PROGRAM FOR IMAGE PROCESSING, AND IMAGE PROCESSING APPARATUS

Priority is claimed under 35 U.S.C. §119 to Japanese Patent Application No. 2007-276286 (filed Oct. 24, 2007), which is herein incorporated by reference in its entirety.

BACKGROUND

1. Technical Field

The present invention relates to an image processing method, a program for image processing, and an image processing apparatus.

2. Related Art

In the technical field to which the present invention pertains, a technique for reducing the processing load of gradation drawing has been proposed. For example, JP-A-11-25282 discloses an image processing technique for reducing processing load for the plotting of gradation through the following procedures. A gradation generating part uses a vector in the direction of change of a transferred color and the information of colors at the start and end points, and sets plural adjacent band-shaped areas vertical to a straight line connecting the start point with the end point whose inside color values are made uniform, and finds a cross point between the boundary of the band-shaped area and a scanning line as the changing point of color. The changing point of the color and a color between the changing points are sequentially found for each scanning line so that the gradation pattern of the scanning direction can be formed. The related-art image processing technique described in JP-A-11-25282 makes it possible to reduce the processing load of gradation drawing through the procedures explained above.

However, a method for color arrangement in the band-shaped areas is not considered in the related-art image processing technique described in JP-A-11-25282. For this reason, for example, when color arrangement is performed for each pixel in a designated target gradation area, there might occur processing overload for the plotting of gradation, which depends on the number of pixels that are arrayed between a start point and an end point and/or the number of colors therebetween. In addition, the related-art image processing technique described in JP-A-11-25282 has another disadvantage in that some displacement (i.e., shift) might occur in the changing point of color for pixels depending on, for example, the angle of gradation inclination. In such a case, it is practically impossible or at best difficult to achieve gradual gradation (i.e., smooth gradation).

SUMMARY

An advantage of some aspects of at least one embodiment of the invention is to provide an image processing method that makes it possible to reduce the processing load of gradation drawing and an image processing apparatus that is capable of reducing processing load for the plotting of gradation. The invention further provides, as an advantage of some aspects of at least one embodiment thereof, an image processing program that is capable of reducing the processing load of gradation drawing. Another advantage of some aspects of at least one embodiment of the invention is to provide an image processing method, a program, and an image processing apparatus each of which makes it possible to achieve gradual gradation drawing.

In order to address at least one of the above-identified problems without any limitation thereto, at least one embodiment of the invention adopts any of the following novel and inventive configurations and features.

The invention provides, as a first aspect of at least one embodiment thereof, an image processing method for generating a gradation image, the image processing method including: (a) acquiring a coordinate of a start point, a color value of the start point, a coordinate of an end point, and a color value of the end point; (b) setting either the number of pixels between the start point and the end point that is calculated on the basis of the coordinates that are acquired in the coordinate-and-color-value acquisition (a) or the number of colors between the start point and the end point, whichever is smaller, as the number of complementary colors of a complementary color list; (c) creating the complementary color list that has the number of complementary colors that is set in the complementary-color-number setting (b); and (d) generating the gradation image with the use of the complementary color list that is created in the complementary-color-list creation (c).

In the image processing method according to the first aspect of at least one embodiment of the invention described above, a gradation image is generated through the following procedures. A coordinate of a start point, a color value of the start point, a coordinate of an end point, and a color value of the end point are acquired. Either the number of pixels between the start point and the end point that is calculated on the basis of the coordinates that are acquired in the coordinate-and-color-value acquisition or the number of colors between the start point and the end point, whichever is smaller, is set as the number of complementary colors of a complementary color list. The complementary color list that has the number of complementary colors that is set in the complementary-color-number setting is created. A gradation image is generated with the use of the complementary color list that is created in the complementary-color-list creation. Since either (1) the number of pixels between the start point and the end point that is calculated on the basis of the coordinates that are acquired in the coordinate-and-color-value acquisition or (2) the number of colors between the start point and the end point, whichever is smaller, is set as the number of complementary colors of a complementary color list, it is possible to avoid any color that is not actually used from being included in the complementary color list. Thus, it is possible to reduce the processing load of gradation drawing (i.e., processing load for the plotting of gradation).

In the image processing method according to the first aspect of at least one embodiment of the invention described above, it is preferable that a plurality of color component values should be acquired as each of the color values in the coordinate-and-color-value acquisition (a); and a color difference value of one of the plurality of color components that has the largest color difference between the start point and the end point should be set as the number of colors between the start point and the end point so as to set either the number of pixels between the start point and the end point that is calculated on the basis of the coordinates that are acquired in the coordinate-and-color-value acquisition (a) or the number of colors between the start point and the end point, whichever is smaller, as the number of complementary colors of the complementary color list in the complementary-color-number setting (b). If such a preferred method is adopted, the number of complementary colors of the complementary color list is set (e.g., determined) while using the above-mentioned one of the plurality of color components that has the largest color difference between the start point and the end point as a comparative basis, that is, for comparison with the number of pixels between the start point and the end point that is calculated on the basis of the coordinates that are acquired in the coordinate-and-color-value acquisition, without using the values of any other color components. For this reason, it is possible to reduce the processing load of gradation drawing. Moreover, since the complementary color list is created with the use of the above-mentioned one of the plurality of color components that has the largest color difference between the start point and the end point as a comparative basis, it is possible to perform gradation drawing with more gradual drawing performance than otherwise.

In the image processing method according to the first aspect of at least one embodiment of the invention described above, it is preferable that a coordinate of an initial start point, a color value of the initial start point, a coordinate of a final end point, a color value of the final end point, a coordinate of one or more intermediate point, and a color value of the above-mentioned one or more intermediate point should be acquired in the coordinate-and-color-value acquisition (a), the initial start point functioning as the start point in an initial process, the final end point functioning as the end point in a final process, and the above-mentioned one or more intermediate point functioning as the start point and/or the end point; the number of complementary colors of each of a plurality of complementary color lists for an area between the corresponding start point and the corresponding end point, the coordinate and the color value of which is acquired in the coordinate-and-color-value acquisition (a), should be set in the complementary-color-number setting (b); the plurality of complementary color lists each of which has the number of complementary colors that is set in the complementary-color-number setting (b) should be created in the complementary-color-list creation (c); and the gradation image should be generated in the gradation image generation (d) with the use of the plurality of complementary color lists that is created in the complementary-color-list creation (c). If such a preferred method is adopted, it is possible to reduce the processing load of gradation drawing at an area between the initial start point and the above-mentioned intermediate point, each area between two of the above-mentioned intermediate points if the number of which is more than one, and an area between the above-mentioned intermediate point and the final end point.

In the image processing method according to the first aspect of at least one embodiment of the invention described above, it is preferable that, in the complementary-color-list creation (c), a color difference value between the color value of the start point that is acquired in the coordinate-and-color-value acquisition (a) and the color value of the end point that is acquired in the coordinate-and-color-value acquisition (a) should be divided by the number of complementary colors of the complementary color list that is set in the complementary-color-number setting (b); and color values corresponding to the number of complementary colors of the complementary color list that is set in the complementary-color-number setting (b) should be determined on the basis of the result of the division so as to create the complementary color list in the same complementary-color-list creation (c).

In the image processing method according to the first aspect of at least one embodiment of the invention described above, it is preferable that, in the gradation image generation (d), an X axis that is orthogonal to a Y axis should be selected as a mapping target axis if an angle of inclination of a gradation line segment that goes from the start point to the end point with respect to the Y axis is larger than 45°, whereas the Y axis should be selected as the mapping target axis if the angle of inclination of the gradation line segment that goes from the start point to the end point with respect to the Y axis is smaller than 45°, either the X axis or the Y axis being selected as the mapping target axis if the angle of inclination of the gradation line segment that goes from the start point to the end point with respect to the Y axis is 45°; in the same gradation image generation (d), an intersection that is formed by an orthogonal line or an orthogonal line segment, which passes through a drawing pixel for which color arrangement should be performed and goes in a direction orthogonal to the gradation line segment, and the gradation line segment should be mapped onto the selected mapping target axis as a mapped intersection; in the same gradation image generation (d), the start point should be mapped onto the selected mapping target axis as a mapped start point; in the same gradation image generation (d), the end point should be mapped onto the selected mapping target axis as a mapped end point; in the same gradation image generation (d), color values that are contained in the complementary color list should be acquired with the use of the mapped intersection, the mapped start point, and the mapped end point; and in the same gradation image generation (d), the color arrangement of the drawing pixel should be performed on the basis of the acquired color values. If such a preferred method is adopted, the X axis is selected as the mapping target axis so as to obtain a larger change amount per unit if the angle of inclination of the gradation line segment that goes from the start point to the end point with respect to the Y axis is larger than 45°, whereas the Y axis is selected as the mapping target axis so as to obtain a larger change amount per unit if the angle of inclination of the gradation line segment that goes from the start point to the end point with respect to the Y axis is smaller than 45°. Therefore, it is possible to perform gradation drawing with more gradual drawing performance than otherwise. In addition, since the color values that are contained in the complementary color list are acquired with the use of the mapped intersection, the mapped start point, and the mapped end point, it is possible to skip complex serial/sequential calculation for the identification of the position of a drawing pixel. For this reason, it is possible to reduce the processing load of gradation drawing. Note that either of the X axis and the Y axis may be selected as the mapping target axis if the angle of inclination of the gradation line segment that goes from the start point to the end point with respect to the Y axis is 45°. In the preferred image processing method described above, it is further preferable to adopt the following features. In the gradation image generation (d), when the color values that are contained in the complementary color list are acquired with the use of the mapped intersection, the mapped start point, and the mapped end point, it should be judged whether the color value of the drawing pixel changes from the color value of the preceding pixel or not on the basis of the ratio of the length of a line segment that goes from the mapped start point to the mapped intersection to the length of another line segment that goes from the mapped start point to the mapped end point; and in the same gradation image generation (d), the preceding color value should be acquired if it is judged that the color value of the drawing pixel does not change from the color value of the preceding pixel, whereas a new color value that is contained in the complementary color list as the next one should be acquired if it is judged that the color value of the drawing pixel changes from the color value of the preceding pixel. Therefore, it is relatively easy to acquire the colors of the complementary color list. For this reason, it is possible to reduce the processing load of gradation drawing.

A program according to a second aspect of at least one embodiment of the invention causes at least one computer to execute the steps of the image processing method according to the first aspect of at least one embodiment of the invention described above. In its practical implementation, such a program may be stored in a computer-readable recording medium (e.g., a hard disk, ROM, FD, CD, DVD, and the like). Alternatively, it may be distributed from one computer to another computer via a transmission medium (a communication network such as the Internet, LAN, or the like). Notwithstanding the above, it may be sent/received through any other alternative means. With the above-mentioned program being executed either by a single personal computer or by plural personal computers (e.g., in a distributed topology), the operation steps of an image processing method according to the first aspect of at least one embodiment of the invention described above are performed/executed by one or more personal computers. Thus, a program according to the second aspect of at least one embodiment of the invention described above offers/produces the same operation/working-effects that are achieved by an image processing method according to the first aspect of at least one embodiment of the invention described above.

The invention provides, as a third aspect of at least one embodiment thereof, an image processing apparatus for generating a gradation image, the image processing apparatus including: a coordinate-and-color-value acquiring section that acquires a coordinate of a start point, a color value of the start point, a coordinate of an end point, and a color value of the end point; a color number setting section that sets either the number of pixels between the start point and the end point that is calculated on the basis of the coordinates that are acquired by the coordinate-and-color-value acquiring section or the number of colors between the start point and the end point, whichever is smaller, as the number of complementary colors of a complementary color list; a list creating section that creates the complementary color list that has the number of complementary colors that is set by the color number setting section; and an image generating section that generates the gradation image with the use of the complementary color list that is created by the list creating section.

In the configuration of an image processing apparatus according to the third aspect of at least one embodiment of the invention described above, a gradation image is generated as follows. A coordinate of a start point, a color value of the start point, a coordinate of an end point, and a color value of the end point are acquired. Either the number of pixels between the start point and the end point that is calculated on the basis of the coordinates that are acquired in the coordinate-and-color-value acquisition or the number of colors between the start point and the end point, whichever is smaller, is set as the number of complementary colors of a complementary color list. The complementary color list that has the number of complementary colors that is set by the color number setting section is created. A gradation image is generated with the use of the complementary color list that is created by the list creating section. Since either (1) the number of pixels between the start point and the end point that is calculated on the basis of the coordinates that are acquired by the coordinate-and-color-value acquiring section or (2) the number of colors between the start point and the end point, whichever is smaller, is set as the number of complementary colors of a complementary color list, it is possible to avoid any color that is not actually used from being included in the complementary color list. Thus, it is possible to reduce the processing load of gradation drawing (i.e., processing load for the plotting of gradation). It should be noted that further constituent element(s) may be added to the above-described basic constituent elements of an information processing apparatus according to the third aspect of at least one embodiment of the invention in order to realize operation/working-effects and/or functions that are offered by constituent elements (e.g., steps) of an information processing method according to the first aspect of at least one embodiment of the invention described above, including the preferred methods thereof.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
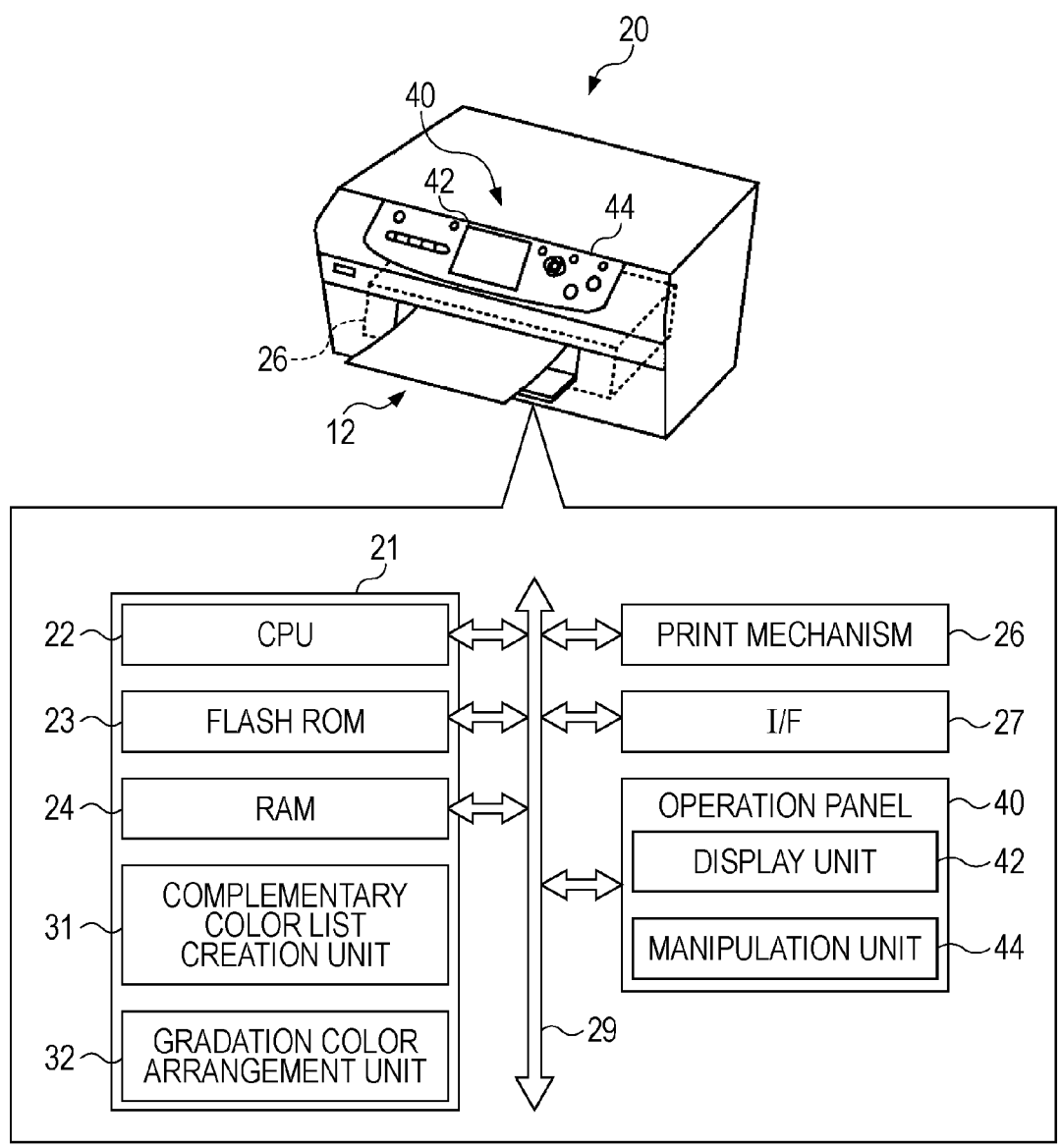
FIG. 1 is a diagram that schematically illustrates an example of the configuration of a printing apparatus 20 according to an exemplary embodiment of the invention.

With reference to the accompanying drawings, the best mode of the invention is explained below. FIG. 1 is a diagram that schematically illustrates an example of the configuration of a printing apparatus 20 according to an exemplary embodiment of the invention. The printer 20 according to the present embodiment of the invention is provided with a controller 21, a print mechanism 26, an external input/output interface (I/F) 27, and an operation panel 40. The controller 21 controls the entire operation of the printer 20. The print mechanism 26 prints an image on a sheet of printing paper 12. The I/F 27 receives information from, and send information to, an external device such as a personal computer or the like that is connected to the printer 20. The operation panel 40 displays information and accepts the input of user instructions. The controller 21 is a microprocessor. In addition to a CPU 22, which is the central function unit thereof, the controller 21 is provided with a flash ROM 23, a RAM 24, a complementary color list creation unit 31, and a gradation color arrangement unit 32. Various kinds of processing programs are stored in the flash ROM 23. The RAM 24 temporarily memorizes data. The complementary color list creation unit 31 creates a complementary color list, which contains color values that are used for the creation of a gradation image. The gradation color arrangement unit 32 arranges color in a gradation area with the use of the complementary color list created by the complementary color list creation unit 31. Through the functional operation of the complementary color list creation unit 31 and the gradation color arrangement unit 32, the controller 21 can convert a vector image that represents graphics under a draw command (i.e., plotting command) that is written in, for example, an XPS (XML Paper Specification) format into a bitmap image. Then, the controller 21 displays and prints the BMP-converted image. Information such as the coordinate of a start point, the color value of the start point, the coordinate of an end point, the color value of the end point, gradation area definition, and the like is stored for a gradation area of a vector image. The print mechanism 26 is an ink-jet print unit that executes print processing. Although the specific mechanism thereof is not illustrated in the accompanying drawings, the ink-jet print unit 26 is provided with a pressure generation structure so as to apply pressure to ink corresponding to each color component. The print mechanism 26 ejects pressurized ink onto a sheet of printing paper 12. Piezoelectric elements, including some kind of modification thereof, may be used for pressurizing ink. Or, alternatively, a thermal ink-ejecting scheme that utilizes air bubbles may be adopted for applying pressure to ink. In the latter exemplary configuration, a heater generates heat so as to form air bubbles. Needless to say, the print mechanism 26 may have any other ink pressurization structure. The operation panel 40 is a user input interface unit that allows a user to input various kinds of commands/instructions into the printer 20. The operation panel 40 is provided with a display unit 42 and a manipulation unit 44. The display unit 42 is embodied as, for example, a liquid crystal display panel that can display color images. The display unit 42 displays various kinds of characters and images in response to and/or in connection with a variety of user instructions/commands. The manipulation unit 44 is used when a user performs various kinds of input operations. For example, the manipulation unit 44 has a cursor control key, which is pressed down for moving a cursor, and an enter key, which is pressed down when a user confirms/determines their selection. The controller 21, the print mechanism 26, the external connection I/F 27, and the operation panel 40 are electrically connected to one another via a bus 29.

Figure 2:
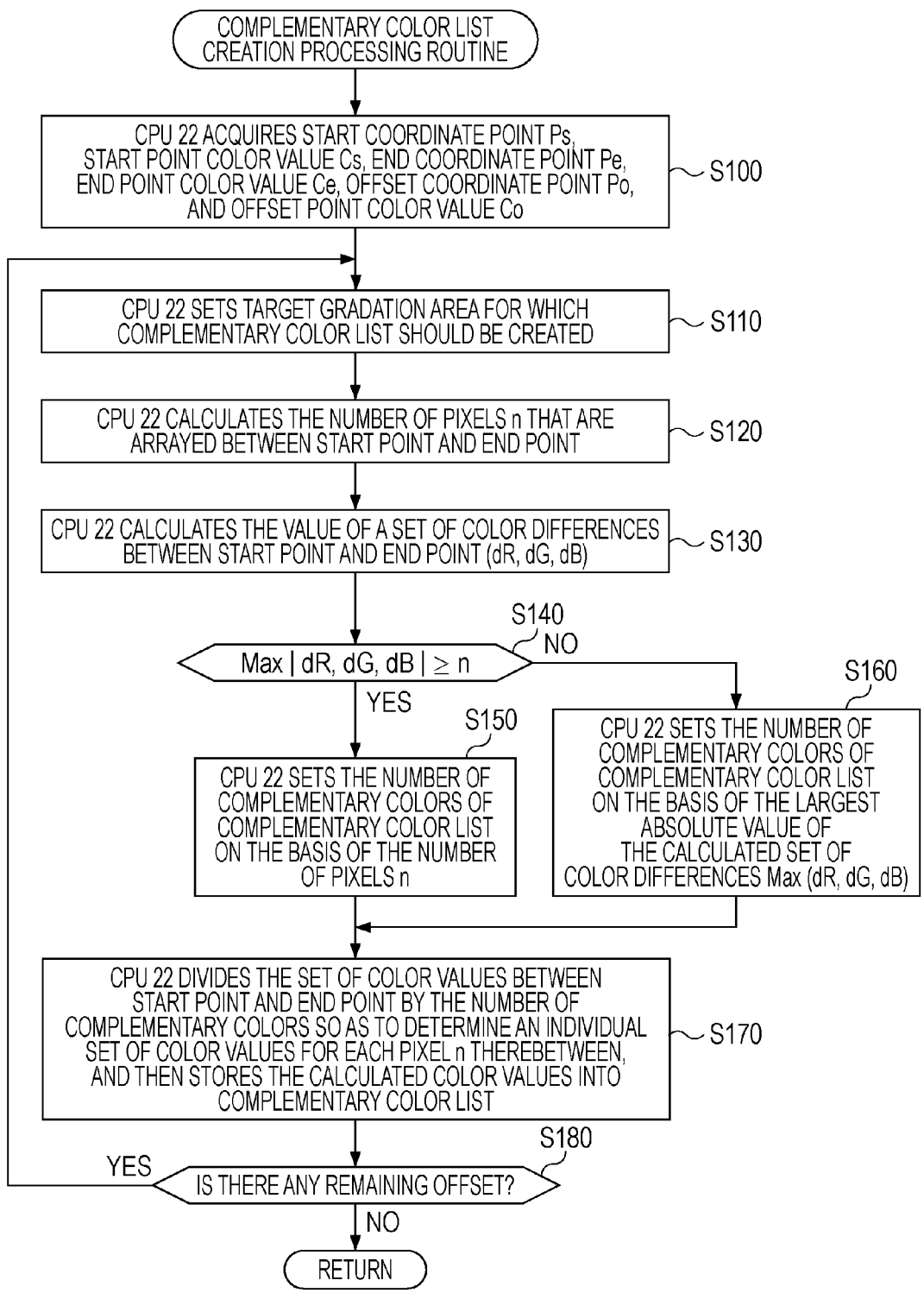
FIG. 2 is a flowchart that schematically illustrates an example of a complementary color list creation processing routine according to an exemplary embodiment of the invention.
Figure 3:
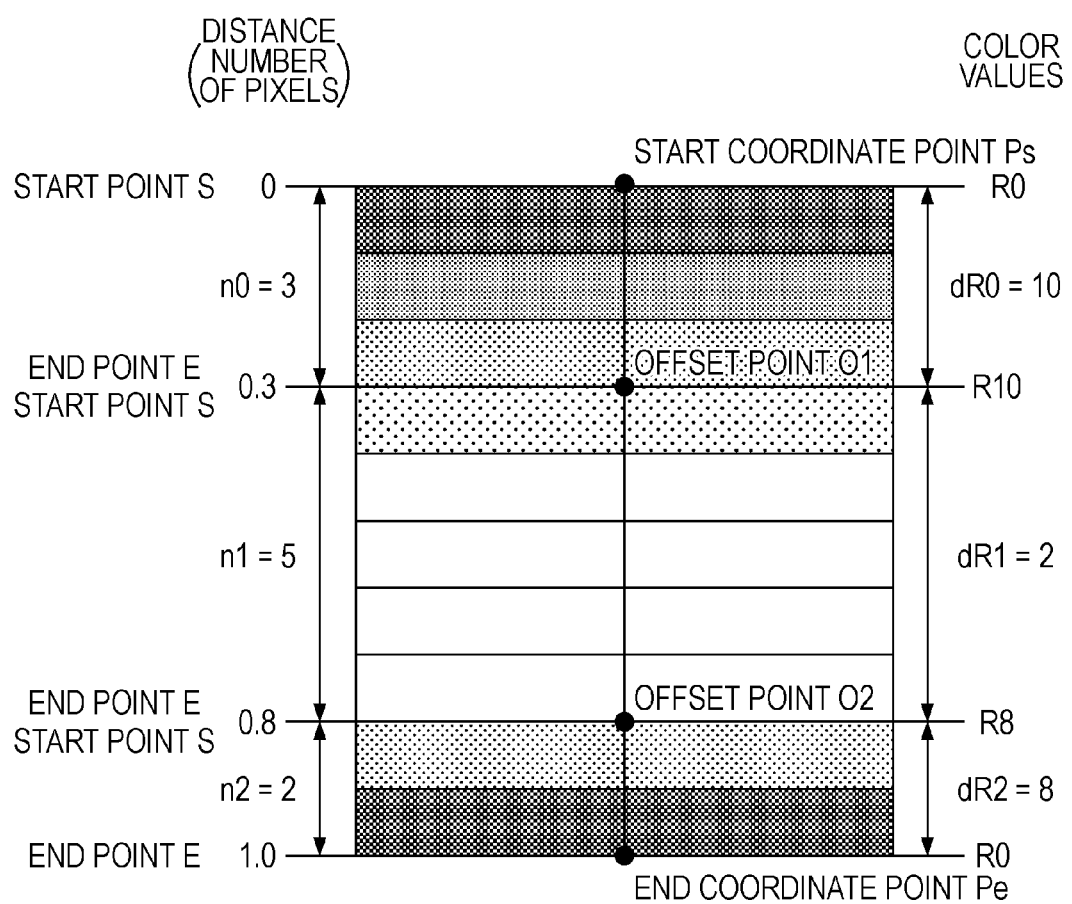
FIG. 3 is a diagram that schematically illustrates an example of a vector image.

Next, the operation of the printer 20 according to the present embodiment of the invention, which has the configuration described above, is explained below. It is assumed herein that a user PC that is not shown in the accompanying drawings sends print-related information to the external connection I/F 27 of the printer 20 in the form of a vector image. The controller 21 expands (e.g., performs conversion processing on, though not limited thereto) the received vector image so as to form a bitmap image for the purpose of printing. In the following description, image expansion (e.g., vector-to-bitmap image conversion, though not limited thereto) for a gradation area is mainly explained. FIG. 2 is a flowchart that schematically illustrates an example of a complementary color list creation processing routine according to an exemplary embodiment of the invention. The complementary color list creation processing routine is a series of procedures that are performed by the CPU 22 of the printer 20. The complementary color list creation processing routine is stored in the flash ROM 23. The complementary color list creation processing routine is executed when a received vector image contains a draw command for a gradation area. The CPU 22 executes the complementary color list creation processing routine through the functional operation of and/or with the use of the complementary color list creation unit 31. As a first step of the complementary color list creation processing routine according to the present embodiment of the invention, the CPU 22 acquires, from received vector image data, information that includes the coordinate Ps of a start point, the color value Cs of the start point, the coordinate Pe of an end point, the color value Ce of the end point, the coordinate Po of an offset point(s), and the color value Co of the offset point(s), though not necessarily limited thereto (step S100). The offset point is a point somewhere between the start point and the end point. FIG. 3 is a diagram that schematically illustrates an example of a vector image. It should be noted that FIG. 3 shows a non-limiting specific example of a gradation image that has two offset points O1 and O2, each of which is a point somewhere between the coordinate Ps of the start point and the coordinate Pe of the end point. The term "initial start point" is used in the description of this specification as well as in the recitation of appended claims so as to mean "the very first start point" corresponding to the coordinate Ps of the start point. The meaning of the very first start point (i.e., initial start point) will be understood from the following description of this specification when read carefully in conjunction with the accompanying drawings. The term "final end point" is used in the description of this specification as well as in the recitation of appended claims so as to mean "the very last end point" corresponding to the coordinate Pe of the end point. The meaning of the very last end point (i.e., final end point) will be understood from the following description of this specification when read carefully in conjunction with the accompanying drawings. In addition, the term "intermediate point(s)" is used in the description of this specification as well as in the recitation of appended claims so as to mean a point(s) somewhere between the very first start point (i.e., initial start point) and the very last end point (i.e., final end point). Typically, gradation is set in XPS in such a manner that the value of the very last end point should be "1.0" if the value of the very first start point is set to be "0.0". In addition, the coordinates of a gradation drawing target area (i.e., plotting target area) at which gradation drawing should be performed are set therein. For the purpose of explanation, it is assumed herein that a gradation area has a rectangular shape. It is further assumed herein that the number of pixels counted from the initial start point (i.e., the very first start point) to the final end point (i.e., the very last end point) is ten. A value is set for each of red (R), green (G), and blue (B) so as to make up a set of values for color components. However, FIG. 3 shows the value of red (R) only as an exemplary color component value. In the following description of a complementary color list creation processing routine according to an exemplary embodiment of the invention, it is assumed that a vector image has a first offset point O1 at a position that is distanced from the coordinate Ps of the start point by three pixels. The red color value of the coordinate Ps of the start point is R0. The red color value of the first offset point O1 is R10. It is further assumed that the vector image has a second offset point O2 at a position that is distanced from the first offset point O1 by five pixels. The red color value of the second offset point O2 is R8. The coordinate Pe of the end point is distanced from the second offset point O2 by two pixels. The red color value of the coordinate Pe of the end point is R0.

As the next step of the complementary color list creation processing routine according to an exemplary embodiment of the invention, the CPU 22 sets a target gradation area for which a complementary color list should be created (step S110). In this example, it is assumed that an area between the coordinate Ps of the start point and the first offset point O1 is set as an initial target gradation area. Accordingly, the coordinate Ps of the start point is taken as an initial start point S, whereas the first offset point O1 is taken as an initial end point E. Next, the CPU 22 calculates the number of pixels "n" that are arrayed between the (initial) start point S (i.e., start coordinate point Ps) and the (initial) end point E (i.e., the first offset point O1) (step S120). The number of pixels n is calculated on the basis of the distance between the start coordinate point Ps and the first offset point O1 and further on the basis of the coordinates of the gradation drawing target area at which gradation drawing should be performed. In this example, the number of pixels n is found as three (i.e., n=3). Next, the CPU 22 calculates the value of a set of color differences between the (initial) start point S (i.e., start coordinate point Ps) and the (initial) end point E (i.e., the first offset point O1) (step S130). For example, it is assumed herein that a set of color values Cs for R component, G component, and B component for the initial start point S, that is, the start coordinate point Ps, is (0, 0, 0). It is further assumed herein that a set of color values Cs for R component, G component, and B component for the initial end point E, that is, the first offset point O1, is (10, 6, 6). In this example, the CPU 22 calculates the value of a set of color differences between the initial start point S and the initial end point E, which is denoted as dR, dG, and dB, as (10, 6, 6). Subsequently, the CPU 22 finds the largest value among the absolute values of the calculated set of color differences dR, dG, and dB (|dR|, |dG|, |dB|), and then makes a judgment as to whether the largest absolute value of the calculated set of color differences is not smaller than (i.e., larger than or at least equal to) the number of pixels n (step S140) or not. If it is judged that the largest absolute value of the calculated set of color differences is not smaller than the number of pixels n (step S140: YES), the CPU 22 sets the number of complementary colors of a complementary color list on the basis of the number of pixels n (step S150). On the other hand, if it is judged that the largest absolute value of the calculated set of color differences is smaller than the number of pixels n (step S140: NO), the CPU 22 sets the number of complementary colors of a complementary color list on the basis of the largest absolute value of the calculated set of color differences (step S160). For example, if the CPU 22 sets the number of complementary colors of a complementary color list on the basis of the number of pixels n when the number of pixels n is not smaller than the largest absolute value of the calculated set of color differences between the start point S and the end point E, it follows that the complementary color list contains more colors than actually used, which should be avoided. In like manner, if the CPU 22 sets the number of complementary colors of a complementary color list on the basis of the largest absolute value of the calculated set of color differences when the largest absolute value of the calculated set of color differences between the start point S and the end point E is not smaller than the number of pixels n, it follows that the complementary color list contains more colors than actually used, which should be avoided. Accordingly, in this processing step, the CPU 22 sets the minimum number of complementary colors that are actually necessary. In addition, since the CPU 22 uses the largest one of the absolute values |dR|, |dG|, and |dB| of the calculated set of color differences between the start point S and the end point E, the number of complementary colors is determined on the basis of one color component that has the largest absolute color difference. By this means, it is possible to achieve a more gradual gradation change than otherwise.

Figure 4:
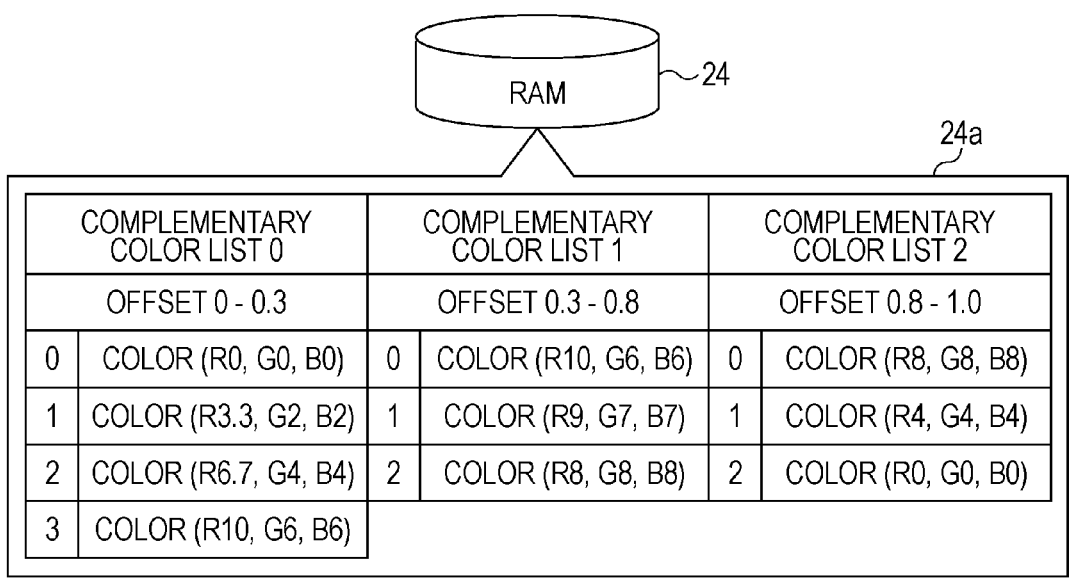
FIG. 4 is a diagram that schematically illustrates an example of the configuration of a complementary color list 24a according to an exemplary embodiment of the invention.

Next, the CPU 22 divides the set of color values (set of color differences) between the start point S and the end point E by the number of complementary colors that was set in the preceding step so as to determine an individual set of color values for each pixel n therebetween as a result of such division, and then stores the calculated color values into a complementary color list (step S170). For example, it is assumed herein that the value of a color difference for the red color component between the (initial) start point S (i.e., start coordinate point Ps) and the (initial) end point E (i.e., the first offset point O1) is ten as shown in FIG. 3. It is further assumed herein that the number of complementary colors is three. In such an exemplary case, the value of the R color difference "10" is divided by the number of complementary colors "3". Then, an individual R color value for each pixel between the start point S and the end point E is determined on the basis of the result of the division. Accordingly, in this exemplary case, the individual R color value for the first pixel is set as "3.3". The individual R color value for the second pixel is set as "6.7", whereas the individual R color value for the third pixel is set as "10". The same division of the set of color values (set of color differences) between the start point S and the end point E by the number of the complementary colors is performed for each of the remaining color components. FIG. 4 is a diagram that schematically illustrates an example of the configuration of a complementary color list 24a according to an exemplary embodiment of the invention. The complementary color list 24a shown in FIG. 4 is an exemplary list that corresponds to the vector image of FIG. 3. Accordingly, the complementary color list 24a shown in FIG. 4 contains an individual complementary color list for each gradation area of the vector image of FIG. 3. In accordance with the foregoing explanation of the complementary color list creation processing routine according to the present embodiment of the invention, an individual complementary color list 0 contains an individual set of color values for each pixel with three complementary colors (first column of data).

Next, the CPU 22 makes a judgment as to whether there is any remaining offset that has not been processed yet or not (step S180). If it is judged that there is any remaining offset that has not been processed yet, the process returns to the previous step S110; and thereafter, the series of procedures (i.e., step S110 and subsequent steps) explained above is repeated. In this example, there remain two unprocessed offsets, one of which is an area between the first offset point O1 and the second offset point O2. The other unprocessed offset is an area between the second offset point O2 and the coordinate Pe of the end point. Accordingly, the area between the first offset point O1 and the second offset point O2 is set as the next target gradation area for which the next complementary color list should be created in the step S110. That is, the first offset point O1 is set as the next start point S, whereas the second offset point O2 is set as the next end point E. The number of pixels n in this offset area is five. On the other hand, the largest value among the absolute values of the calculated set of color differences is two in this area. As a result of a judgment made in the step S140, the CPU 22 finds that the largest absolute value of the calculated set of color differences is smaller than the number of pixels n. Accordingly, the CPU 22 sets the number of complementary colors of a complementary color list on the basis of the largest absolute value of the calculated set of color differences. Therefore, the number of complementary colors for this offset area is determined as two. Then, in the step S170, the CPU 22 divides the set of color values (set of color differences) between the start point S and the end point E by the number of complementary colors that was set in the preceding step so as to determine an individual set of color values for each pixel n therebetween as a result of such division, and then stores the calculated color values into a complementary color list 1, which is the same procedure as that of the determination of individual color values for the complementary color list 0. In this example, there still remains one unprocessed offset, which is an area between the second offset point O2 and the coordinate Pe of the end point. Accordingly, the area between the second offset point O2 and the coordinate Pe of the end point is set as the next (i.e., final) target gradation area for which the next complementary color list should be created in the step S110.

That is, the second offset point O2 is set as the final start point S, whereas the end coordinate point Pe is set as the final end point E. The number of pixels n in this final area is two. On the other hand, the largest value among the absolute values of the calculated set of color differences is eight in this area. As a result of a judgment made in the step S140, the CPU 22 finds that the largest absolute value of the calculated set of color differences is larger than the number of pixels n. Accordingly, the CPU 22 sets the number of complementary colors of a complementary color list on the basis of the number of pixels n. Therefore, the number of complementary colors for this final area is determined as two. Then, in the step S170, the CPU 22 divides the set of color values (set of color differences) between the start point S and the end point E by the number of complementary colors that was set in the preceding step so as to determine an individual set of color values for each pixel n therebetween as a result of such division, and then stores the calculated color values into a complementary color list 2, which is the same procedure as that of the determination of individual color values for each of the complementary color lists 0 and 1. Then, it is judged in the step S180 that there remains no offset that has not been processed yet. Accordingly, the CPU 22 ends the complementary color list creation processing routine according to the present embodiment of the invention. As explained above, in the complementary color list creation processing routine according to the present embodiment of the invention, the CPU 22 sets the minimum number of complementary colors that are actually necessary for the creation of the complementary color list 24a, that is, for the creation of each of the complementary color lists 0, 1, and 2.

Figure 5:
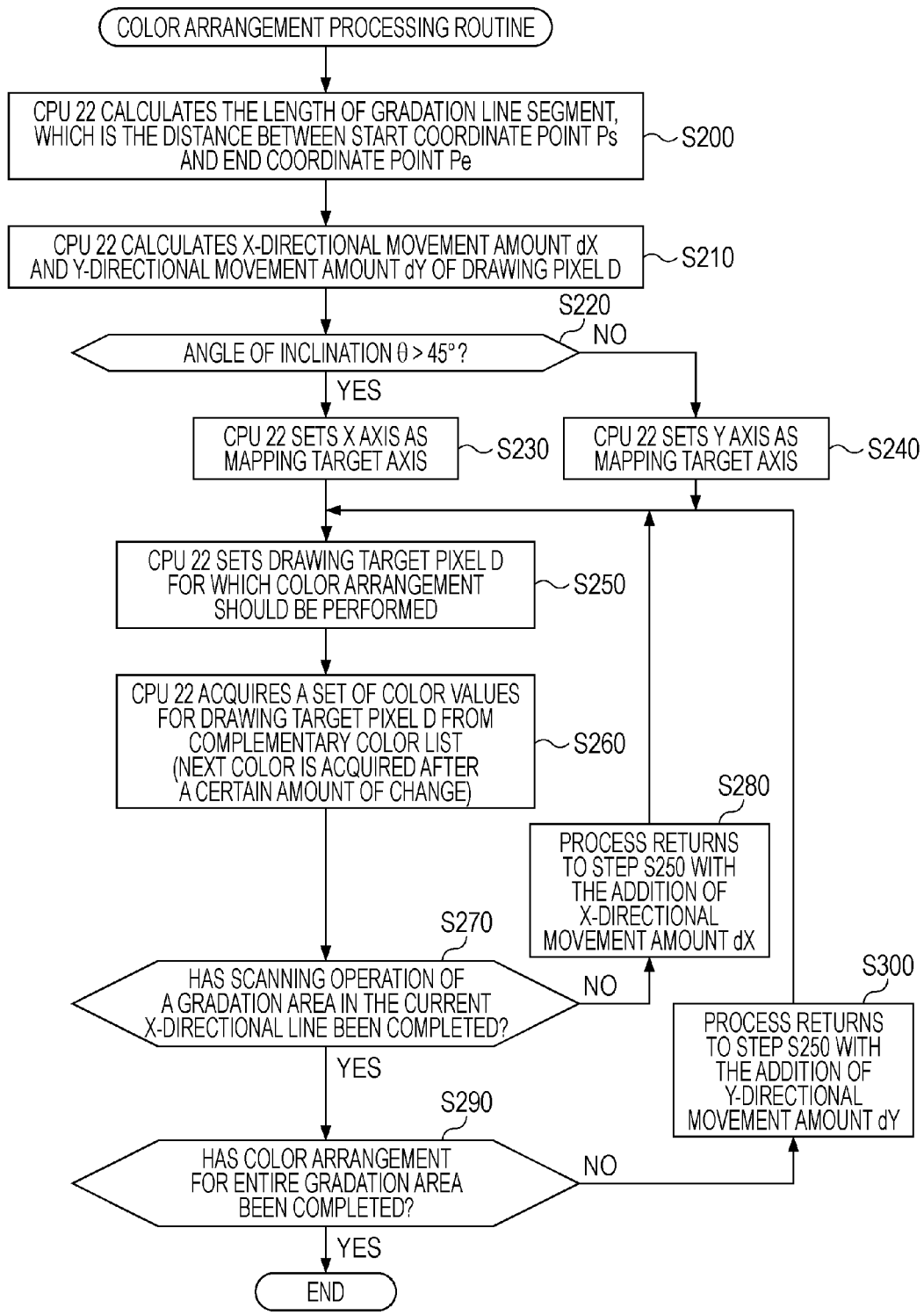
FIG. 5 is a flowchart that schematically illustrates an example of a color arrangement processing routine according to an exemplary embodiment of the invention.

In the following description, a series of procedures that are executed for gradation-area drawing is explained. The gradation-area drawing is performed with the use of the complementary color list 24a, which has been created in the complementary color list creation processing routine explained above. FIG. 5 is a flowchart that schematically illustrates an example of a color arrangement processing routine according to an exemplary embodiment of the invention. The color arrangement processing routine is a series of procedures that are performed by the CPU 22 of the printer 20. The color arrangement processing routine is stored in the flash ROM 23. The color arrangement processing routine is executed after the completion of the complementary color list creation processing routine explained above. The CPU 22 executes the color arrangement processing routine through the functional operation of and/or with the use of the aforementioned gradation color arrangement unit 32. As a first step of the color arrangement processing routine according to the present embodiment of the invention, the CPU 22 calculates the length of a gradation line segment SE, which is the distance between the coordinate Ps of the start point and the coordinate Pe of the end point (step S200). Next, the CPU 22 calculates the X-directional movement amount dX of a drawing pixel D, which is the target pixel of color arrangement processing (step S210). The X direction corresponds to a horizontal direction. In addition, in this step S210, the CPU 22 calculates the Y-directional movement amount dY of the drawing pixel D. The Y direction corresponds to a vertical direction. Assuming that the gradation line segment SE has a certain inclination with respect to, that is, as viewed from, the vertical axis Y, the amount of the movement of a drawing pixel corresponding to one pixel differs depending on a slope angle (i.e., angle of inclination) $\theta$ of the gradation line segment SE. The CPU 22 calculates the X-directional movement amount dX of a drawing pixel D and the Y-directional movement amount dY thereof in this step S210 so as to accurately find the movement amount thereof. If the movement amounts dX and dY are added at each movement of a drawing pixel corresponding to one pixel, it is possible to easily calculate the position of the drawing pixel without any need to perform more complex serial/sequential calculation on the basis of the relationship between the drawing pixel and the inclined gradation line segment SE.

Next, the CPU 22 makes a judgment as to whether the angle of inclination $\theta$ of the gradation line segment SE with respect to the Y axis is larger than 45° or not (step S220). If it is judged that the angle of inclination $\theta$ of the gradation line segment SE as viewed from (i.e., with respect to) the Y axis is larger than 45° (step S220: YES), the CPU 22 sets the X axis as a mapping target axis (step S230). On the other hand, if it is judged that the angle of inclination $\theta$ of the gradation line segment SE as viewed from the Y axis is not larger than 45° (step S220: NO), the CPU 22 sets the Y axis as a mapping target axis (step S240). In the description of this specification as well as in the recitation of appended claims, the term "mapping target axis" means a reference axis onto which a drawing pixel D, a start point S, an end point E, and the like are mapped. The mapping target axis is mainly used as a reference for obtaining information on the position of the drawing pixel D and each point of change in color values.

Figure 6:
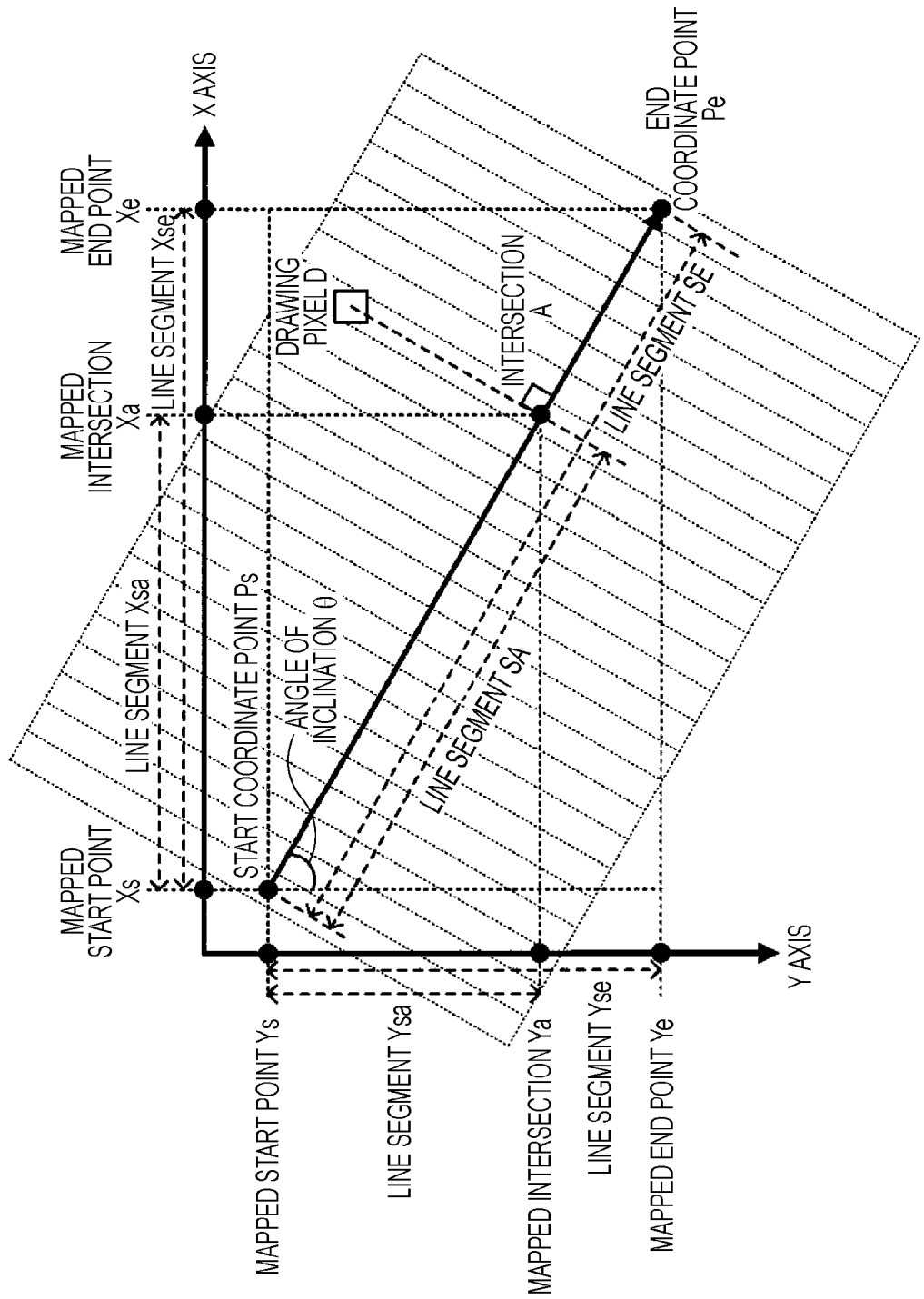
FIG. 6 is a diagram that schematically illustrates an example of color arrangement processing according to an exemplary embodiment of the invention that is performed when the angle of inclination θ of a gradation line segment with respect to the Y axis is larger than 45°.
Figure 7:
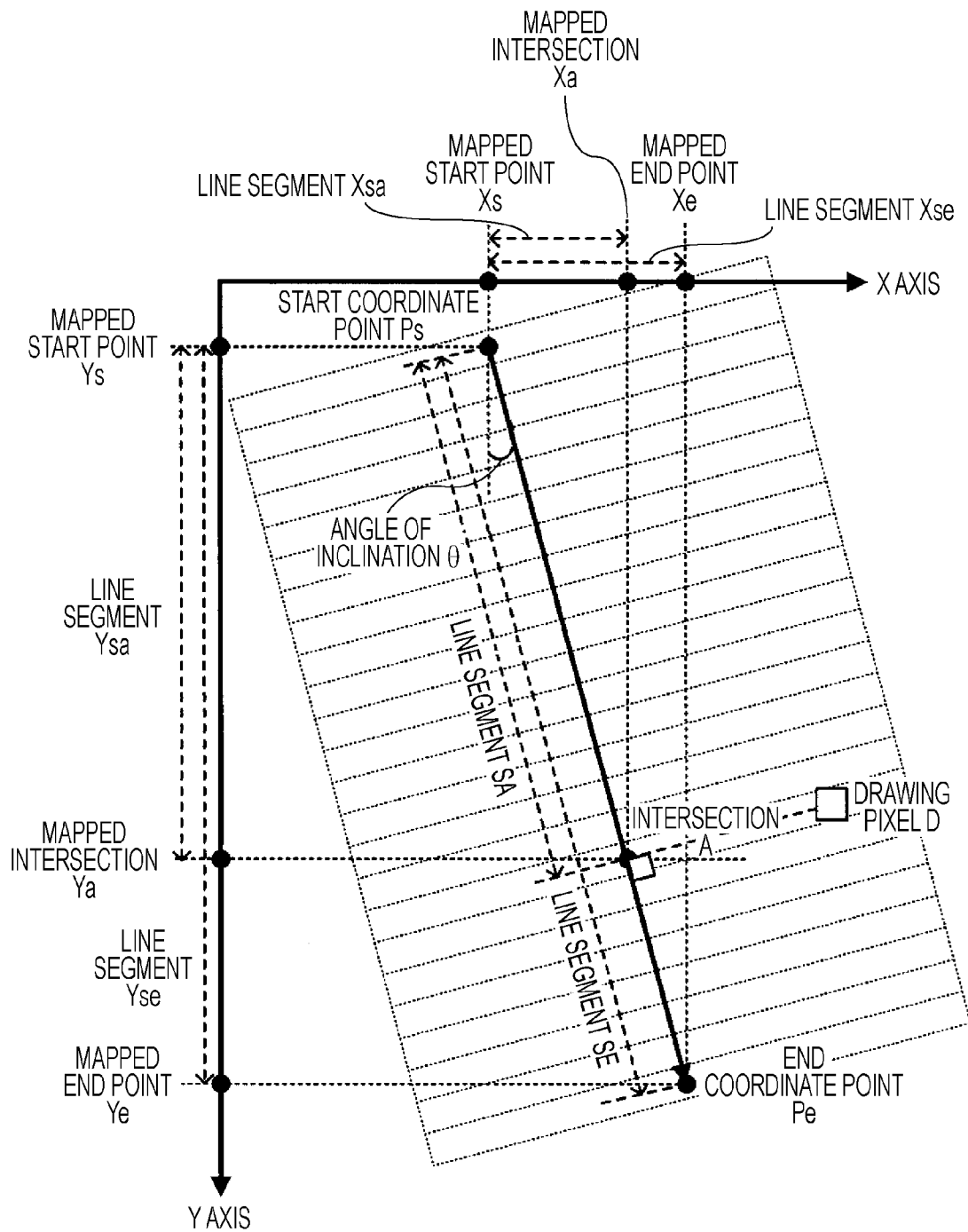
FIG. 7 is a diagram that schematically illustrates an example of color arrangement processing according to an exemplary embodiment of the invention that is performed when the angle of inclination θ of a gradation line segment with respect to the Y axis is smaller than 45°.

A method for obtaining information on the position of the drawing pixel D and each point of change in color values is explained below. FIG. 6 is a diagram that schematically illustrates an example of color arrangement processing according to an exemplary embodiment of the invention that is performed when the angle of inclination $\theta$ of the gradation line segment SE with respect to the Y axis is larger than 45°. FIG. 7 is a diagram that schematically illustrates an example of color arrangement processing according to an exemplary embodiment of the invention that is performed when the angle of inclination $\theta$ of the gradation line segment SE with respect to the Y axis is smaller than 45°. It is assumed that the same single color is assigned to a rectangular area that is shown by dotted lines in each of FIGS. 6 and 7 as viewed in a direction orthogonal to the gradation line segment SE. It is further assumed herein that a drawing pixel D moves in the X direction, which is the scan direction thereof, and then moves in the Y direction by one pixel after reaching the end of each X scan line. After moving to the next line, the drawing pixel D moves in the X direction. The above-explained scanning operation is repeated until the color arrangement of an entire target area is completed. An orthogonal line (line segment) that passes through the drawing pixel D and goes in a direction perpendicular to the gradation line segment SE is shown by a dotted line in FIG. 6. The above-mentioned orthogonal line and the gradation line segment SE form a point of intersection, which is denoted as A in the drawing. The point of intersection A is mapped onto the horizontal axis X as a mapped intersection Xa. The start point S (i.e., start coordinate point Ps) is mapped onto the horizontal axis X as a mapped start point Xs, whereas the end point E (i.e., end coordinate point Pe) is mapped onto the horizontal axis X as a mapped end point Xe. As will be understood from the drawing, in the color arrangement processing routine according to an exemplary embodiment of the invention, the ratio of a line segment SA to the line segment SE is equal to the ratio of a mapped line segment Xsa to a mapped line segment Xse. Taking advantage of such proportionality, with the use of the mapped intersection Xa, the mapped start point Xs, and the mapped end point Xe, which are obtained as a result of the mapping of the intersection A, the start point S, and the end point E, respectively, it is possible to easily calculate the position of the drawing pixel D without any need to serially/ sequentially calculate the length of the inclined line segment SA and the length of the inclined gradation line segment SE. In addition, since it is judged whether the drawing pixel D has moved to a certain pixel at which a set of color values should be switched over to the next set of color values contained in the complementary color list 24a or not by means of and/or on the basis of the X-directional movement amount dX thereof, it is possible to easily obtain information on the point of color-value switchover. The same holds true for a case where the vertical axis Y is taken as the mapping target axis. Note that, taking advantage of the above-explained relationships between the ratio of the line segment SA to the line segment SE and the ratio of the mapped line segment Xsa to the mapped line segment Xse, it is possible to obtain information on the percentage of a color arrangement task that has already been completed on the basis of the latter ratio. That is, color arrangement lists are switched over on the basis of the ratio of the mapped line segment Xsa to the mapped line segment Xse. More specifically, a switchover from the complementary color list 0 to the complementary color list 1 (refer to FIGS. 3 and 4) is performed when the ratio of the mapped line segment Xsa to the mapped line segment Xse is 0.3:1. It should be further noted that, if it is judged in the aforementioned step S220 that the angle of inclination θ of the gradation line segment SE as viewed from the vertical axis Y is larger than 45° (refer to FIG. 6), the CPU 22 sets the horizontal axis X as the mapping target axis defined above because the distance between the mapped start point Xs, which is mapped from the start point S, and the mapped intersection Xa, which is mapped from the intersection A, is larger than the distance between the "mapped" start point Ys, which would be obtained if mapped from the start point S, and the "mapped" intersection Ya, which would be obtained if mapped from the intersection A, as well as because the distance between the mapped start point Xs, which is mapped from the start point S, and the mapped end point Xe, which is mapped from the end point E, is larger than the distance between the "mapped" start point Ys, which would be obtained if mapped from the start point S, and the "mapped" end point Ye, which would be obtained if mapped from the end point E. In other words, if the angle of inclination θ of the gradation line segment SE with respect to the vertical axis Y is larger than 45°, the CPU 22 sets the horizontal axis X as the mapping target axis defined above because the lengths of the mapped line segments Xsa and Xse are greater than the lengths of the line segments Ysa and Yse that would be obtained if the vertical axis Y were taken as the mapping target axis, which is not the case, respectively. On the other hand, if it is judged in the aforementioned step S220 that the angle of inclination θ of the gradation line segment SE as viewed from the vertical axis Y is not larger than 45° (refer to FIG. 7), the CPU 22 sets the vertical axis Y as the mapping target axis defined above because the distance between the mapped start point Ys, which is mapped from the start point S, and the mapped intersection Ya, which is mapped from the intersection A, is larger than the distance between the "mapped" start point Xs, which would be obtained if mapped from the start point S, and the "mapped" intersection Xa, which would be obtained if mapped from the intersection A, as well as because the distance between the mapped start point Ys, which is mapped from the start point S, and the mapped end point Ye, which is mapped from the end point E, is larger than the distance between the "mapped" start point Xs, which would be obtained if mapped from the start point S, and the "mapped" end point Xe, which would be obtained if mapped from the end point E. In other words, if the angle of inclination θ of the gradation line segment SE with respect to the vertical axis Y is not larger than 45°, the CPU 22 sets the vertical axis Y as the mapping target axis defined above because the lengths of the mapped line segments Ysa and Yse are greater than the lengths of the line segments Xsa and Xse that would be obtained if the horizontal axis X were taken as the mapping target axis, which is not the case, respectively. By this means, it is possible to achieve more gradual color arrangement that has a smaller margin of error than otherwise.

The CPU 22 sets a drawing target pixel D for which color arrangement should be performed (step S250). Then, the CPU 22 acquires a set of color values for this drawing target pixel D from the complementary color list 24a (step S260). Thereafter, the CPU 22 makes a judgment as to whether the scanning operation of a gradation area in the current X-directional line has been finished or not (step S270). If it is judged that the scanning operation of a gradation area in the current X-directional line has not been finished yet (step S270: NO), the process returns to the above-mentioned step S250 with the addition of the X-directional movement amount dX (step S280). Then, the next pixel that is immediately adjacent to the above-mentioned drawing target pixel D is set as the next drawing target pixel D. Then, the CPU 22 acquires a set of color values for this drawing target pixel D from the complementary color list 24a (step S260). In this step S260, if it is judged that the drawing pixel D has moved to a certain pixel at which a set of color values should be switched over to the next set of color values contained in the complementary color list 24a, that is, if the number of pixels in such sequential movement has reached a point of switchover that is set in the complementary color list 24a, the next set of color values is acquired. In this way, the CPU 22 reads out a set of color values that corresponds to the number of pixels from the complementary color list 0 or the complementary color list 1, which are switched over in the order of appearance herein, that is, from the complementary color list 0 to the complementary color list 1. If it is judged that the scanning operation of a gradation area in the current X-directional line has been finished (step S270: YES), the CPU 22 makes a judgment as to whether color arrangement for the entire gradation area has been completed or not (step S290). If it is judged that color arrangement for the entire gradation area has not been finished yet (step S290: NO), the process returns to the previous step S250 with the addition of the movement amount dY (step S300). In such a case, a pixel that is immediately under the above-mentioned line is set as the drawing pixel D. Thereafter, the steps S260 and subsequent steps are repeated. If it is judged that color arrangement for the entire gradation area has been finished (step S290: YES), the CPU 22 ends the color arrangement processing routine according to the present embodiment of the invention.

In this paragraph, the corresponding relationships between processing steps described in the present embodiment of the invention and constituent elements according to an aspect of at least one embodiment of the invention are explained. In addition, in this paragraph, the corresponding relationships between components/units described in the present embodiment of the invention and constituent elements according to an aspect of at least one embodiment of the invention are explained. The step S100 of the complementary color list creation processing routine that is described in the present embodiment of the invention is one way to perform the acquiring step of claim 1 that corresponds to a constituent element (a) according to an aspect of at least one embodiment of the invention. The steps S140, S150, and S160 of the complementary color list creation processing routine that are described in the present embodiment of the invention is one way to perform the setting step of claim 1 that corresponds to a constituent element (b) according to an aspect of at least one embodiment of the invention. The step S170 of the complementary color list creation processing routine that is described in the present embodiment of the invention is one way to perform the creating step of claim 1 that corresponds to a constituent element (c) according to an aspect of at least one embodiment of the invention. The steps of the color arrangement processing routine that are described in the present embodiment of the invention is one way to perform the generating step of claim 1 that corresponds to a constituent element (d) according to an aspect of at least one embodiment of the invention. The controller 21 that is described in the present embodiment of the invention corresponds to a coordinate-and-color-value acquiring section according to an aspect of at least one embodiment of the invention, a color number (i.e., number of colors) setting section according to an aspect of at least one embodiment of the invention, a list creating section according to an aspect of at least one embodiment of the invention, and an image generating section according to an aspect of at least one embodiment of the invention. It should be noted that the explanation of the operations of the printing apparatus 20 according to an exemplary embodiment of the invention given above provides a descriptive and illustrative support for not only an image processing method according to an aspect of at least one embodiment of the invention and an image processing apparatus according to an aspect of at least one embodiment of the invention but also an image processing program according to an aspect of at least one embodiment of the invention.

The printing apparatus 20 according to the foregoing exemplary embodiment of the invention has a coordinate-and-color-value acquiring unit that acquires a coordinate of a start point, a color value of the start point, a coordinate of an end point, and a color value of the end point; a color number setting unit that sets either the number of pixels "n" between the start point and the end point that is calculated on the basis of the coordinates that are acquired by the coordinate-and-color-value acquiring unit or the number of colors between the start point and the end point, whichever is smaller, as the number of complementary colors of a complementary color list 24a; a list creating unit that creates the complementary color list 24a that has the number of complementary colors that is set by the color number setting unit; and an image generating unit that generates the gradation image with the use of the complementary color list 24a that is created by the list creating unit. Therefore, it is possible to avoid any color that is not actually used from being included in the complementary color list 24a. Thus, it is possible to reduce the processing load of gradation drawing (i.e., processing load for the plotting of gradation). In addition, in the operation of the printing apparatus 20 according to the foregoing exemplary embodiment of the invention, a plurality of color component values is acquired as each of the color values in the coordinate-and-color-value acquisition step; and a color difference value of one of the plurality of color components that has the largest color difference between the start point and the end point is set as the number of colors between the start point and the end point so as to set either the number of pixels n between the start point and the end point that is calculated on the basis of the coordinates that are acquired in the coordinate-and-color-value acquisition step or the number of colors between the start point and the end point, whichever is smaller, as the number of complementary colors of the complementary color list 24a in the complementary-color-number setting step. Accordingly, the number of complementary colors of the complementary color list 24a is set (e.g., determined) while using the above-mentioned one of the plurality of color components that has the largest color difference between the start point and the end point as a comparative basis, that is, for comparison with the number of pixels n between the start point and the end point that is calculated on the basis of the coordinates that are acquired in the coordinate-and-color-value acquisition step, without using the values of any other color components. For this reason, it is possible to reduce the processing load of gradation drawing. Moreover, in the operation of the printing apparatus 20 according to the foregoing exemplary embodiment of the invention, since the complementary color list 24a is created with the use of the above-mentioned one of the plurality of color components that has the largest color difference between the start point and the end point as a comparative basis, that is, for comparison with the number of pixels n between the start point and the end point that is calculated on the basis of the coordinates that are acquired in the coordinate-and-color-value acquisition step, without using the values of any other color components, it is possible to perform gradation drawing with more gradual drawing performance than otherwise. Furthermore, in the operation of the printing apparatus 20 according to the foregoing exemplary embodiment of the invention, since a plurality of complementary color lists is created for a plurality of areas that is demarcated by a plurality of points that includes the start coordinate point Ps, the end coordinate point Pe, and one or more offset points O, which is a non-limiting example of one or more intermediate point, that is, at least one point somewhere between the start coordinate point Ps and the end coordinate point Pe. For this reason, it is possible to reduce the processing load of gradation drawing at the plurality of areas. Still furthermore, in the gradation image generation operation of the printing apparatus 20 according to the foregoing exemplary embodiment of the invention, an X axis that is orthogonal to a Y axis is selected as a mapping target axis if an angle of inclination θ of a gradation line segment SE that goes from the start point S to the end point E with respect to the Y axis is larger than 45°, whereas the Y axis is selected as the mapping target axis if the angle of inclination θ of the gradation line segment SE that goes from the start point S to the end point E with respect to the Y axis is not larger than 45°. By this means, it is possible to ensure that mapping is performed on the optimum mapping target axis that offers a relatively large distance between a mapped start point and a mapped intersection and a relatively large distance between a mapped start point and a mapped end point. By this means, it is possible to achieve more gradual gradation drawing that has a smaller margin of error than otherwise. In addition, since the color values that are contained in the complementary color list are acquired with the use of the mapped intersection, the mapped start point, and the mapped end point, it is possible to skip complex serial/sequential calculation for the identification of the position of a drawing pixel. For this reason, it is possible to reduce the processing load of gradation drawing. Still furthermore, in the gradation image generation operation of the printing apparatus 20 according to the foregoing exemplary embodiment of the invention, when the color values that are contained in the complementary color list are acquired with the use of the mapped intersection, the mapped start point, and the mapped end point, it is judged whether the color value of the drawing pixel changes from the color value of the preceding pixel or not on the basis of the ratio of the length of a line segment that goes from the mapped start point to the mapped intersection to the length of another line segment that goes from the mapped start point to the mapped end point. Therefore, it is relatively easy to acquire the colors of the complementary color list. For this reason, it is possible to reduce the processing load of gradation drawing. Still furthermore, the stored complementary color list 24a makes it possible to calculate the color value of a certain drawing pixel D at a certain position with relative ease without requiring any complex calculation from the initial position thereof to the above-mentioned certain position thereof.

Needless to say, the invention should be in no case understood to be restricted to any exemplary embodiment thereof described above. That is, the invention may be configured or implemented in an adaptable manner in a variety of variations or modifications thereof without departing from the spirit thereof, which should be deemed to be encompassed within the technical scope thereof.

In the foregoing description of exemplary embodiments of the invention, it is explained that a vector image that contains the start coordinate point Ps, the end coordinate point Pe, and one or more offset point O is expanded into a bitmap image. However, the scope of the invention is not limited to such an exemplary configuration. For example, a vector image that does not include any offset point may be expanded into a bitmap image. The scope of the invention is not limited to an XPS vector image. The complementary color list 24a according to the foregoing exemplary embodiment of the invention makes it possible to reduce the processing load of gradation drawing for such a modified configuration/method.

In the foregoing description of exemplary embodiments of the invention, it is explained that a vector image contains values that correspond to the color components of R, G, and B. However, the scope of the invention is not limited to such an exemplary configuration. The color components may be made up of C, M, Y, and K. Or, as another alternative example, the color components may be made up of Y, U, and V. In the foregoing description of exemplary embodiments of the invention, it is explained that either the number of pixels n between the start point S and the end point E or a color difference value of one of the plurality of color components that has the largest color difference between the start point S and the end point E, whichever is judged as a smaller value, is set as the number of complementary colors of the complementary color list 24a. However, the scope of the invention is not limited to such an exemplary configuration/method.

In the foregoing description of exemplary embodiments of the invention, it is explained that the CPU 22 divides the set of color values between the start point S and the end point E by the number of complementary colors so as to determine an individual set of color values for each pixel n therebetween as a result of such division, and then stores the calculated color values into a complementary color list. However, the method for setting color values is not limited to such an example. Any other alternative method for setting color values may be adopted.

In the foregoing description of exemplary embodiments of the invention, it is explained that the Y axis is selected as the mapping target axis if the angle of inclination θ of the gradation line segment SE that goes from the start point S to the end point E with respect to the Y axis is 45°. However, the scope of the invention is not limited to such an exemplary configuration/method. It may be the X axis that is selected as the mapping target axis if the angle of inclination θ of the gradation line segment SE that goes from the start point S to the end point E with respect to the Y axis is 45°. Moreover, in the foregoing description of exemplary embodiments of the invention, it is explained that a mapping target axis is selected on the basis of the result of judgment as to whether the angle of inclination θ of the gradation line segment SE that goes from the start point S to the end point E with respect to the Y axis is larger than 45° or not. However, the scope of the invention is not limited to such an exemplary configuration/method. For example, either the X axis or the Y axis may be set in advance as the predetermined mapping target axis. Furthermore, in the foregoing description of exemplary embodiments of the invention, it is explained that color arrangement processing is performed with the use of the mapping target axis. However, the scope of the invention is not limited to such an exemplary configuration/method. For example, color arrangement processing may be performed with the use of the line segment SA and the line segment SE in place of the mapping target axis. Even with such a modified configuration/method, the complementary color list 24a makes it possible to reduce the processing load of gradation drawing.

In the foregoing description of exemplary embodiments of the invention, the printer 20 is taken as an example of an image processing apparatus according to an aspect of the invention. However, the scope of the invention is not limited such an exemplary configuration. An image processing apparatus according to an aspect of the invention can be embodied as various kinds of devices that generate a bitmap image from a vector image, including but not limited to, a digital camera, digital video equipment, a mobile phone, a television, a personal computer, a portable game machine, video recording equipment such as a video cartridge recorder or an HDD recorder, a photo viewer, or a PDA (Personal Digital Assistant). In the foregoing description of this specification, the invention is embodied as the printer 20, which is a non-limiting example of an image processing apparatus according to one aspect thereof. Needless to say, however, the invention is applicable to an image processing method, which is another aspect thereof. Or, the invention is applicable to a program for image processing, which is still another aspect thereof.

What is claimed is:

1. An image processing method for generating a gradation image, the image processing method comprising:
    (a) acquiring a coordinate of a start point, a color value of the start point including a plurality of color component values, a coordinate of an end point, and a color value of the end point including a plurality of color component values;
    (b) setting either a number of pixels between the start point and the end point that is calculated on the basis of the coordinates that are acquired in the coordinate-and-color-value acquisition (a) or a color difference value of one of the plurality of color components values of the start and end points that has a largest color difference between the start point and the end point, whichever is smaller, as a number of complementary colors of a complementary color list;
    (c) creating the complementary color list that has the number of complementary colors that is set in the complementary-color-number setting (b);
    (d) generating the gradation image with the use of the complementary color list that is created in the complementary-color-list creation (c); and
    (e) causing the gradation image to be printed.

2. The image processing method according to claim 1, wherein
    a coordinate of an initial start point, a color value of the initial start point, a coordinate of a final end point, a color value of the final end point, a coordinate of one or more intermediate point, and a color value of the above-mentioned one or more intermediate point are acquired in the coordinate-and-color-value acquisition (a), the initial start point functioning as the start point in an initial process, the final end point functioning as the end point in a final process, and the above-mentioned one or more intermediate point functioning as the start point and/or the end point;

the number of complementary colors of each of a plurality of complementary color lists for an area between the corresponding start point and the corresponding end point, the coordinate and the color value of which is acquired in the coordinate-and-color-value acquisition (a), is set in the complementary-color-number setting (b);

the plurality of complementary color lists each of which has the number of complementary colors that is set in the complementary-color-number setting (b) is created in the complementary-color-list creation (c); and the gradation image is generated in the gradation image generation (d) with the use of the plurality of complementary color lists that is created in the complementary-color-list creation (c).

3. The image processing method according to claim 1, wherein, in the complementary-color-list creation (c), for each of the plurality of color components, a color difference value between the color component value of the start point that is acquired in the coordinate-and-color-value acquisition (a) and the color component value of the end point that is acquired in the coordinate-and-color-value acquisition (a) is divided by the number of complementary colors of the complementary color list that is set in the complementary-color-number setting (b); and color values corresponding to the number of complementary colors of the complementary color list that is set in the complementary-color-number setting (b) are determined on the basis of a result of the division so as to create the complementary color list in the same complementary-color-list creation (c).

4. The image processing method according to claim 1, wherein, in the gradation image generation (d), an X axis that is orthogonal to a Y axis is selected as a mapping target axis if an angle of inclination of a gradation line segment that goes from the start point to the end point with respect to the Y axis is larger than a predetermined angle threshold, whereas the Y axis is selected as the mapping target axis if the angle of inclination of the gradation line segment that goes from the start point to the end point with respect to the Y axis is smaller than the predetermined angle threshold, either the X axis or the Y axis being selected as the mapping target axis if the angle of inclination of the gradation line segment that goes from the start point to the end point with respect to the Y axis is equal to the predetermined angle threshold;

in the same gradation image generation (d), an intersection that is formed by an orthogonal line or an orthogonal line segment, which passes through a drawing pixel for which color arrangement should be performed and goes in a direction orthogonal to the gradation line segment, and the gradation line segment is mapped onto the selected mapping target axis as a mapped intersection;

in the same gradation image generation (d), the start point is mapped onto the selected mapping target axis as a mapped start point;

in the same gradation image generation (d), the end point is mapped onto the selected mapping target axis as a mapped end point;

in the same gradation image generation (d), color values that are contained in the complementary color list are acquired with the use of the mapped intersection, the mapped start point, and the mapped end point; and in the same gradation image generation (d), the color arrangement of the drawing pixel is performed on the basis of the acquired color values.

5. The image processing method according to claim 4, wherein, in the gradation image generation (d), when the color values that are contained in the complementary color list are acquired with the use of the mapped intersection, the mapped start point, and the mapped end point, it is judged whether the color value of the drawing pixel changes from the color value of the preceding pixel or not on the basis of the ratio of the length of a line segment that goes from the mapped start point to the mapped intersection to the length of another line segment that goes from the mapped start point to the mapped end point; and in the same gradation image generation (d), the preceding color value is acquired if it is judged that the color value of the drawing pixel does not change from the color value of the preceding pixel, whereas a new color value that is contained in the complementary color list as the next one is acquired if it is judged that the color value of the drawing pixel changes from the color value of the preceding pixel.

6. A computer-readable recording medium having stored thereon a program that causes at least one computer to execute the steps of the image processing method according to claim 1.

7. An image processing apparatus for generating a gradation image, the image processing apparatus comprising:

a coordinate-and-color-value acquiring section that acquires a coordinate of a start point, a color value of the start point including a plurality of color component values, a coordinate of an end point, and a color value of the end point including a plurality of color component values;

a color number setting section that sets either a number of pixels between the start point and the end point that is calculated on the basis of the coordinates that are acquired by the coordinate-and-color-value acquiring section or a color difference value of one of the plurality of color components values of the start and end points that has a largest color difference between the start point and the end point, whichever is smaller, as a number of complementary colors of a complementary color list;

a list creating section that creates the complementary color list that has the number of complementary colors that is set by the color number setting section; and an image generating section that generates the gradation image with the use of the complementary color list that is created by the list creating section.

8. The image processing apparatus according to claim 7, further comprising a controller that includes the coordinate-and-color-value acquiring section, the color number setting section, the list creating section, and the image generating section.

9. The image processing apparatus according to claim 7, further comprising a printer configured to print the gradation image.

* * * * *